United States Patent
Solfrank et al.

(10) Patent No.: US 8,555,848 B2
(45) Date of Patent: Oct. 15, 2013

(54) MASS BALANCING MECHANISM AND ASSEMBLY METHOD

(75) Inventors: Peter Solfrank, Frensdorf (DE); Tobias Mederer, Schwanstetten (DE); Alexander Tasche, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 277 days.

(21) Appl. No.: 12/900,801

(22) Filed: Oct. 8, 2010

(65) Prior Publication Data

US 2011/0083632 A1  Apr. 14, 2011

Related U.S. Application Data

(60) Provisional application No. 61/249,662, filed on Oct. 8, 2009.

(51) Int. Cl.
*F02B 75/06* (2006.01)

(52) U.S. Cl.
USPC ......... 123/192.2; 123/192.1; 74/603; 74/604; 74/574.2; 74/574.4

(58) Field of Classification Search
USPC ........ 123/192.2, 192.1, 90.17, 90.15; 27/700; 74/603, 604, 574.2, 574.4, 572.4; 474/148, 180, 101, 103, 109, 110, 111, 474/112
See application file for complete search history.

(56) References Cited

U.S. PATENT DOCUMENTS

| 2,280,384 | A | * | 4/1942 | Diekson | 74/604 |
| 2,914,964 | A | * | 12/1959 | Wolf-Dieter et al. | 74/604 |
| 3,109,417 | A | * | 11/1963 | Bekkala et al. | 123/90.15 |
| 3,110,195 | A | * | 11/1963 | Hanley | 74/604 |
| 3,960,419 | A | * | 6/1976 | Brawley | 384/571 |
| 4,377,992 | A | * | 3/1983 | Zeilinger et al. | 123/192.2 |
| 4,572,025 | A | * | 2/1986 | Mitchell | 74/604 |
| 4,989,999 | A | * | 2/1991 | Siemensmeyer | 384/455 |
| 6,189,499 | B1 | * | 2/2001 | Iwata et al. | 123/192.2 |

(Continued)

FOREIGN PATENT DOCUMENTS

| DE | 4206899 | C1 | * | 12/1992 |
| EP | 1775484 | | | 4/2007 |

OTHER PUBLICATIONS

Machine translation of DE 4206899C1, "DE4206899C1_translation.pdf".*
"Motortechnische Zeitschrift MTZ", Issue Oct. 2006.

*Primary Examiner* — Noah Kamen
*Assistant Examiner* — Long T Tran
(74) *Attorney, Agent, or Firm* — Volpe and Koenig, P.C.

(57) ABSTRACT

A mass balancing mechanism and method of assembly of the same is provided. The mass balancing mechanism compensates mass forces and/or mass moments of inertia of an internal combustion engine and includes two compensation shafts and a traction drive which connects a driven pinion of the crankshaft to drive pinions of the compensation shafts through a traction mechanism. Rotation of the compensation shafts is achieved through a spur gearing with two meshing spur gears arranged between one of the drive pinions and the associated compensation shaft, one of the spur gears being connected to the one drive pinion and the other of the spur gears being connected to the associated compensation shaft. For adjusting the tooth flank lash between the spur gears, an eccentric bearing having a rotationally fixable eccentric raceway is provided by the invention.

11 Claims, 4 Drawing Sheets

(56) References Cited

U.S. PATENT DOCUMENTS

| | | | |
|---|---|---|---|
| 6,286,474 B1 * | 9/2001 | Downs et al. | 123/192.2 |
| 6,988,479 B2 * | 1/2006 | Hamilton | 123/192.2 |
| 7,265,080 B2 * | 9/2007 | Iso et al. | 508/182 |
| 7,434,560 B2 * | 10/2008 | Ohsawa | 123/192.2 |
| 7,628,133 B2 * | 12/2009 | Tisch et al. | 123/192.2 |
| 2004/0040533 A1 * | 3/2004 | Laimboeck | 123/197.1 |
| 2004/0050533 A1 * | 3/2004 | Chesser et al. | 165/46 |
| 2006/0252655 A1 * | 11/2006 | Iso et al. | 508/154 |
| 2007/0177837 A1 * | 8/2007 | Tisch et al. | 384/548 |
| 2008/0181549 A1 * | 7/2008 | Nakano et al. | 384/570 |

\* cited by examiner

MASS BALANCING MECHANISM AND ASSEMBLY METHOD

CROSS-REFERENCE TO RELATED APPLICATIONS

This application claims the benefit of U.S. Provisional Application 61/249,662, filed Oct. 8, 2009, which is incorporated herein by reference as if fully set forth.

FIELD OF THE INVENTION

The invention concerns a mass balancing mechanism for compensating mass forces and/or mass moments of inertia of an internal combustion engine. The mass balancing mechanism comprises two compensation shafts rotating in opposite directions and a traction drive which connects a driven pinion of the crankshaft of the internal combustion engine to drive pinions of the compensation shafts through a chain or a toothed belt. For producing the rotation of the shafts in opposite directions, a spur gearing with two meshing spur gears is arranged between one of the drive pinions and the associated compensation shaft, one of said spur gears is connected rotationally fixed to one of the drive pinions and another one of the spur gears is connected rotationally fixed to the associated compensation shaft.

The invention further concerns a method of assembling a mass balancing mechanism into a structural unit.

BACKGROUND

A mass balancing mechanism of the above-noted type is known from the German periodical "Motortechnische Zeitschrift MTZ", Issue 10/2006, and mostly serves as a so-called Lancaster compensation to compensate both the free mass forces of the second order and the free mass moments of inertia of the second order about the longitudinal axis of the internal combustion engine in a four-cylinder, in-line internal combustion engine. In the cited periodical, the compensation shafts driven by a chain drive extend for this purpose on both sides of and at different heights relative to the driving crankshaft of the internal combustion engine. Inversion of the direction of rotation of one of the compensation shafts is achieved through a spur gearing comprising two helical spur gears arranged between one of the shaft-side chain sprockets and the associated compensation shaft.

SUMMARY

It is the object of the present invention to provide a constructional improvement of a mass balancing mechanism of the above-noted type with respect to better acoustics, low wear and ease of assembly.

The above object is achieved in the mechanism of the invention by the fact that for adjusting the tooth flank lash between the spur gears, the invention provides an eccentric bearing possessing a rotationally fixable eccentric raceway about whose central axis the one drive pinion and the one spur gear rotate. In other words, the invention provides the possibility of adjusting the tooth flank lash related to component tolerances, so that, in particular, by a rotation and fixing of the eccentric raceway during the first assembly of the mass balancing mechanism, the actual lash is situated within a desired lash value which is optimal with regard to noise development and component wear.

Advantageous developments of the invention form the subject matter of the dependent claims related to the mechanism.

According to one feature of the invention, the eccentric bearing is a rolling bearing comprising an inner ring that forms the eccentric raceway, an outer ring and rolling bearing arranged between the inner and the outer ring. A distinctive feature of the rolling bearing compared to an alternatively usable hydrodynamic sliding bearing is its comparatively low friction loss.

Against this background, the invention provides that each of the compensation shafts comprises a drive-side end section on which a rolling bearing supporting the compensation shaft in radial and in axial direction in the internal combustion engine is received. A bearing carrier that can be fixed on the internal combustion engine is provided on the side of the spur gearing and receives the eccentric bearing and the shaft-side rolling bearing. The bearing carrier can be, for example, a die-cast part. However, with a view to low manufacturing costs, it should preferably be made by cold shaping of a sheet metal blank. The smaller the material thickness of the sheet metal blank, the smaller is its axial design space requirement.

On the eccentric bearing-side, the bearing carrier can comprise an annular mandrel which is enclosed by the inner ring of the eccentric bearing, and on the side of the shaft-side rolling bearing, the bearing carrier can comprise a hollow cylinder that encloses the outer ring of the shaft-side rolling bearing. Particularly in the case of the bearing carrier made as a sheet metal shaped part, the inner ring of the eccentric bearing is rotatably fixed by a press fit realized between the annular mandrel and the inner ring by widening the annular mandrel. Alternatively, other known fixing methods such as a (thermal) transverse press fit between annular mandrel and inner ring can also be used.

Further, the annular mandrel is intended to serve for receiving a screw connection through which the bearing carrier is fixed on the internal combustion engine. The screw connection is configured at the same time for rotatably fixing the inner ring of the eccentric bearing. The fixing action of the aforesaid press fit between the annular mandrel and the inner ring can thus be of a provisional nature in the sense that the press fit has a just adequate breakaway torque for merely effecting a temporary prevention of rotation of the adjusted eccentric bearing till the screwing of the bearing carrier on the internal combustion engine is accomplished.

Alternatively or optionally, fixing of the bearing carrier on the internal combustion engine can also be achieved with a screw connection situated outside of the annular mandrel. In this case, however, the fixing arrangement of the inner ring of the eccentric bearing on the annual mandrel must be durably strong enough to bear the operational loads after the tooth flank lash has been adjusted. This can be guaranteed by an adequate transverse press fit.

As an alternative to a stud bolt attached to the internal combustion engine, the screw connection comprises a collar screw that can be screwed into a threaded bore of the internal combustion engine. Through this, the inner ring of the eccentric bearing is clamped axially between the screw collar and the bearing carrier.

In an embodiment particularly preferred with a view to ease of assembly, the compensation shafts are configured as tunnel shafts that can be introduced in direction of their axes of rotation into a mounting channel of the internal combustion engine. In this case, the one drive pinion, the eccentric bearing, the spur gearing, the bearing carrier, the associated compensation shaft and the shaft-side rolling bearing form a structural unit that can be mounted on the internal combustion engine with the inner ring of the eccentric bearing rotatably fixed on the annular mandrel. The pre-assembled structural unit with adjusted tooth flank lash can be supplied to the manufacturer of the internal combustion engine as a vendor part and can be mounted on the internal combustion engine without further adjustment work. This applies in a correspondingly restricted manner also to sub-assemblies of the assembled unit, with, for example, the compensation shafts being assembled only on the assembly belt of the internal combustion engine.

As for the method of assembly, the invention achieves its object by following method steps:
Adjustment of the tooth flank lash between the spur gears by rotating the inner ring of the eccentric bearing into such a position that the tooth flank lash is situated within a desired range,
Retention of the inner ring in this position and
Plastic widening of the annular mandrel for realizing a press fit that rotatably fixes the inner ring on the annular mandrel.

The result of this method is the realization of the structural unit described above with the tooth flank lash adjusted with the help of the press fit between the annular mandrel and the inner ring of the eccentric bearing. In the aforesaid case that the annular mandrel serves to receive a screw connection through which the bearing carrier can be fixed on the internal combustion engine, following additional method steps are required for mounting the structural unit on the internal combustion engine:
Insertion of the structural unit into the internal combustion engine and
Tightening of the screw connection, so that the inner ring of the eccentric bearing is rotatably fixed by axial bracing against the bearing carrier.

BRIEF DESCRIPTION OF THE DRAWINGS

Further features of the invention result from the following description and the drawings which, for a better understanding of the invention, show important details, partially represented in simplified illustrations, of one example of embodiment of a mass balancing mechanism of the invention, in longitudinal section, as well as a prior art mass balancing mechanism. If not otherwise stated, identical or functionally identical features or components are identified by the same reference numerals. The figures show.

DETAILED DESCRIPTION OF THE DRAWINGS

Figure 10:
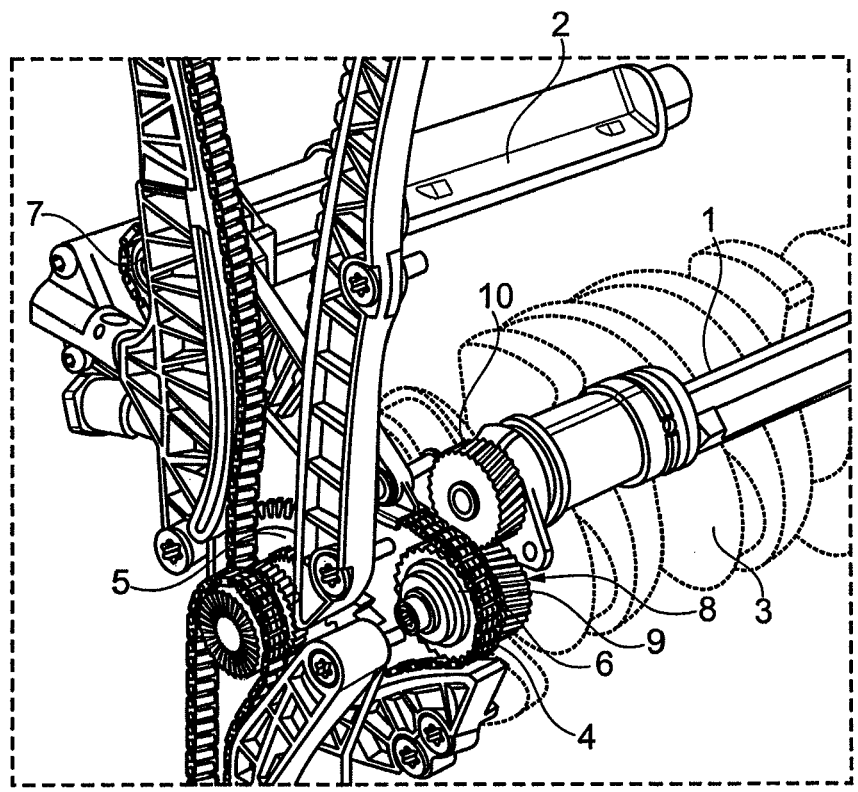
FIG. 10 is a view of a prior art mass balancing mechanism in a perspective representation.

The description of the invention starts with reference to FIG. 10 in which a mass balancing mechanism of a 4-cylinder in-line internal combustion engine known from the previously-cited periodical (MTZ) is to be seen. The mass balancing mechanism comprises two compensation shafts 1 and 2 which rotate in opposite directions at double the speed of the crankshaft 3. The compensation shafts 1, 2 are driven by a traction drive in the form of a chain drive whose chain 4 connects a driven pinion 5 of the crankshaft 3 to drive pinions 6 and 7 of the compensation shafts 1, 2. The oppositely oriented rotation of the compensation shafts 1, 2 is produced through a spur gearing 8 comprising two meshing, helically toothed spur gears 9 and 10. The one spur gear 9 is arranged coaxially behind the one drive pinion 6 and connected rotatably fixed thereto, while the other spur gear 10 is arranged coaxially on the associated compensation shaft 1 and connected rotatably thereto. The other drive pinion 7 is fixed directly on the other compensation shaft 2 coaxially thereto.

The compensation shafts 1, 2 are positioned relative to the crankshaft 3 such that their transverse and vertical offset compensates not only the free mass forces of the second order but also the free alternating moments about the longitudinal axis of the internal combustion engine.

The mounting arrangement of the compensation shafts 1, 2 is a so-called tunnel mounting in which the compensation shafts 1, 2 are inserted from the front end of the internal combustion engine into closed mounting channels. The mounting points of the compensation shafts 1, 2 are configured as sliding bearings connected on the pressure side to the lubricant circuit of the internal combustion engine.

Figure 1:
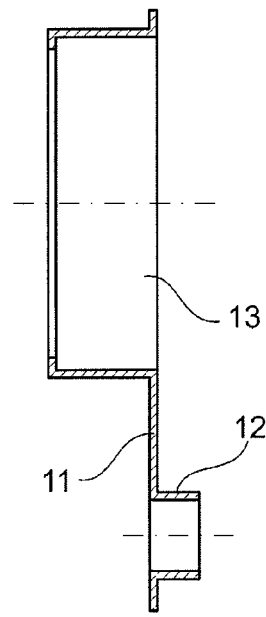
FIGS. 1 to 6 are views showing the assembly sequence of a structural unit of a mass balancing mechanism that can be mounted on the internal combustion engine.
Figure 2:
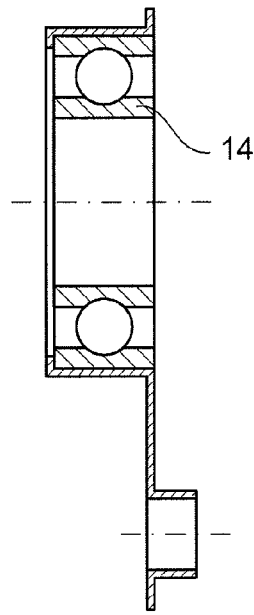

The construction and assembly of a mass balancing mechanism of the invention which, with moderate modifications to the internal combustion engine is exchangeable with the prior art mass balancing mechanism of FIG. 10, is disclosed in the following description with reference to FIGS. 1 to 6. FIGS. 1 and 2 show a bearing carrier 11 which is made by cold shaping, that is to say, by punching and deep drawing of an approximately 1 mm thick sheet metal blank. On one side, the bearing carrier 11 comprises a shaped annular mandrel 12 and on the other side, a shaped hollow cylinder 13 which extends in a direction opposite to the annular mandrel 12 and into which the outer ring of a rolling bearing in the form of a deep groove ball bearing 14 is pressed.

Figure 3:
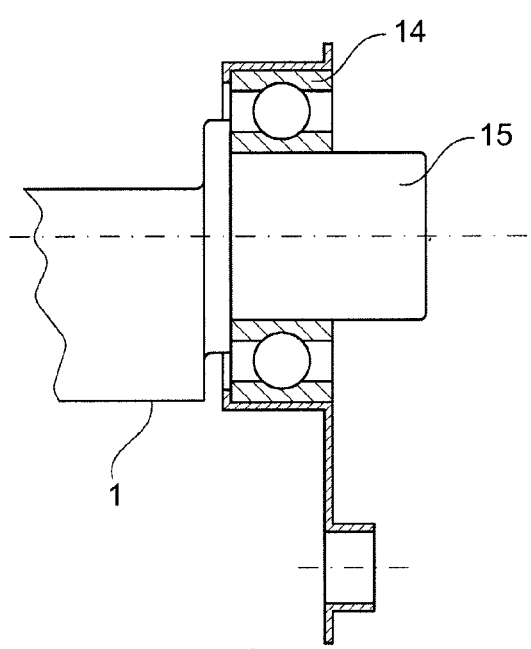
Figure 4:
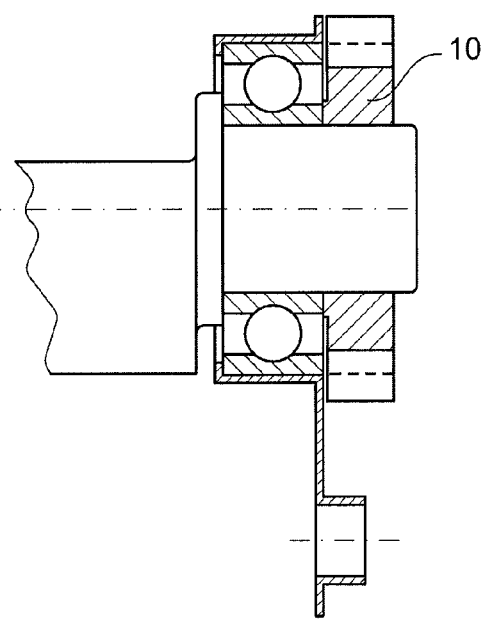

FIGS. 3 and 4 show the drive-side end section 15 of a compensation shaft 1 which is then pressed into the deep groove ball bearing 14. On the still protruding part of the end section 15, a spur gear 10 of a spur gearing 8 is connected rotationally fixed to the compensation shaft 1, in the present case by force locking through a press fit. Both compensation shafts 1 and 2, whose further extension is not represented, are tunnel-mounted compensation shafts whose mounting journals serve as raceways for needle roller bushings with unpressurized lubrication, which journals are tapered at their low-load peripheral sections for reducing mass. A compensation shaft of this type is basically disclosed in EP 1 775 484 A4 whose content is explicitly included herein by reference as if fully set forth.

Figure 5:
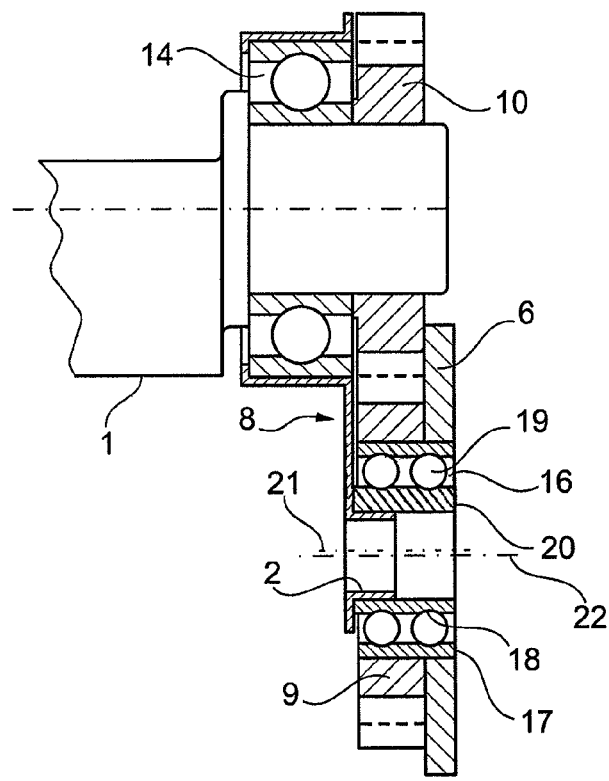
Figure 6:
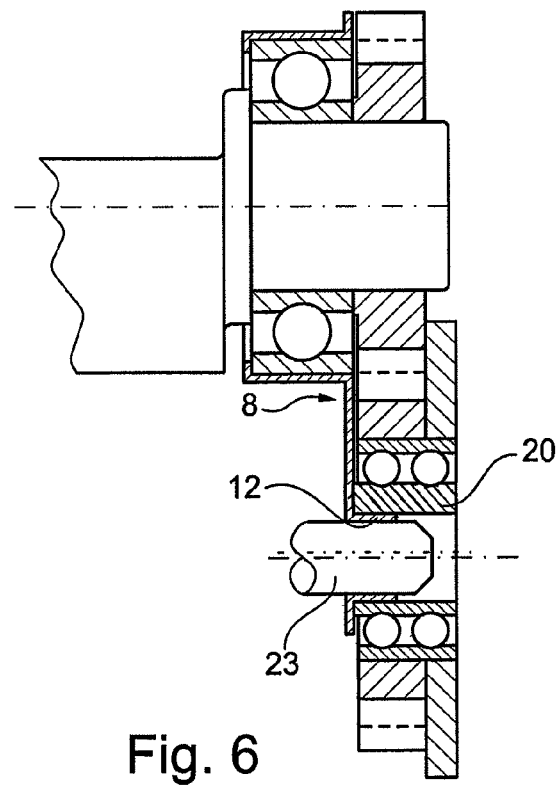

FIG. 5 shows a structural unit which can be mounted on the internal combustion engine and comprises the compensation shaft 1, the deep groove ball bearing 14, the spur gearing 8, including the one spur gear 9 and the other spur gear 10, an eccentric bearing 16, and also the drive chain pinion 6. The drive pinion 6 and the one spur gear 9, force-locked in the present example by a press fit, are connected rotationally fast to each other on the outer ring 17 of the eccentric bearing 16 which is configured as a double-row deep groove ball bearing. The inner ring 20 of the eccentric bearing 16 configured as an eccentric raceway 18 for the balls 19 encloses in its eccentric bore, the annular mandrel 12, at first with a loose fit. The central axis of the eccentric raceway 18 is identified at 21 and the central axis of the annular mandrel 12 is identified at 22.

The eccentric bearing 16 serves for adjusting the tooth flank lash between the spur gears 9, 10 in that the inner ring 20 with the eccentric raceway 18, is rotated into a position in which the tooth flank lash is situated within a desired range. As shown roughly in FIG. 6, the annular mandrel 12 is plastically widened in the thus adjusted position with help of a calibrating die 23 for creating a press fit which fixes the inner ring 20 rotatably on the annular mandrel 12. The press fit possesses a relatively low breakaway torque which is intended only to prevent a rotation of the inner ring 20 till the adjusted spur gearing 8 is mounted on the internal combustion engine.

Figure 7:
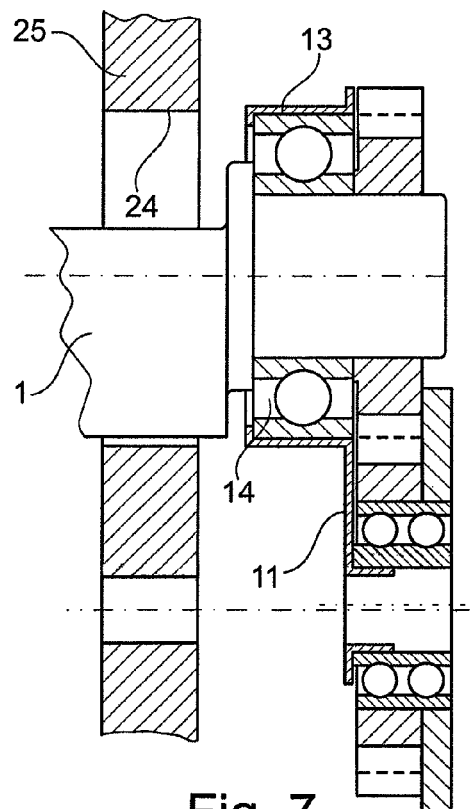
FIGS. 7 to 9 are views showing the mounting sequence of the structural unit on the internal combustion engine.
Figure 8:
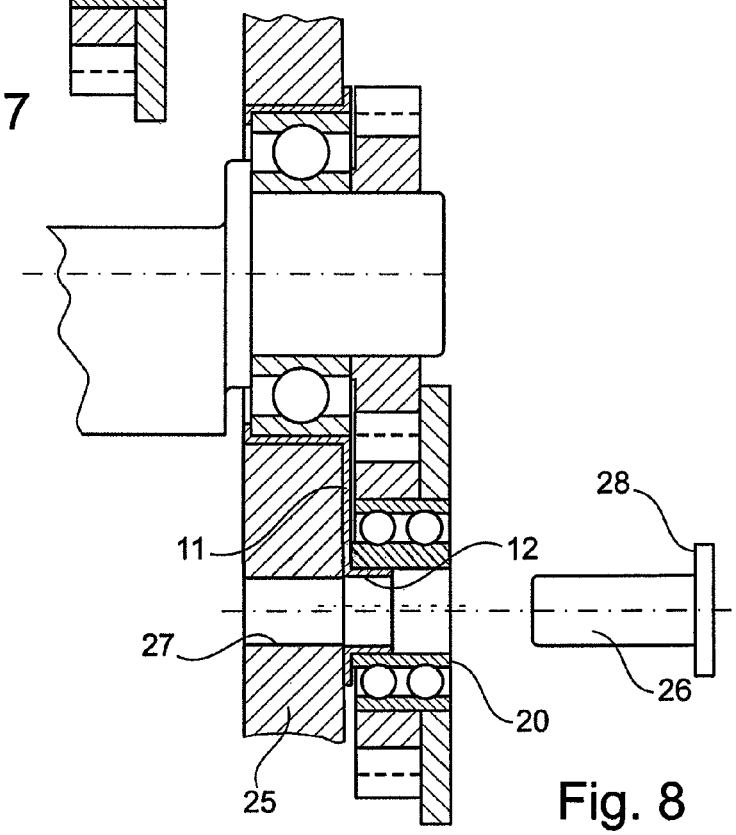
Figure 9:
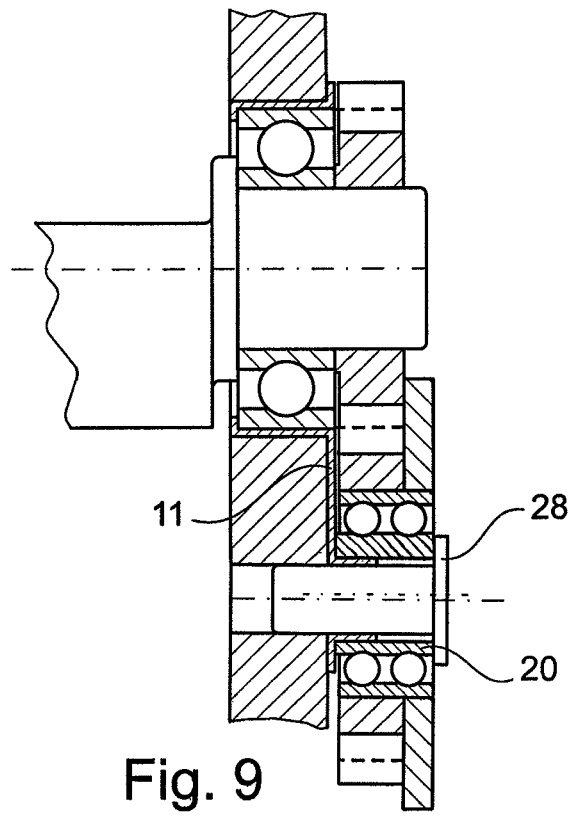

FIGS. 7 to 9 show the mounting sequence of the structural unit on the internal combustion engine. The compensation shaft 1 is inserted into a mounting channel together with the needle roller bushings mounted thereon (not shown), until the hollow cylinder 13 of the bearing carrier 11 is inserted with a press fit in a first mounting point 24 of the mounting channel, and the bearing carrier 11 comes to bear against a front end wall 25 of the internal combustion engine. The deep groove ball bearing 14 serves to support radial forces as well as axial forces of the compensation shaft 1 in the mounting channel introduced via the bearing carrier.

The annular mandrel 12 is configured to receive a screw connection, in the present case a collar screw 26, and extends coaxially to a threaded bore 27 in the front end wall 25. The collar screw 26 screwed into the threaded bore 27 serves on the one hand to fix the bearing carrier 11 on the front end wall 25, and on the other hand to enable a rotatable fixing of the inner ring 20 beyond the radial press fit with the annular mandrel 12. This is achieved by the fact that, during the tightening of the screw connection, the inner ring 20 is axially braced between the screw collar 28 and the bearing carrier 11.

LIST OF REFERENCE NUMERALS

1 Compensation shaft
2 Compensation shaft
3 Crankshaft
4 Chain
5 Driven pinion
6 Drive pinion
7 Drive pinion
8 Spur gearing
9 Spur gear
10 Spur gear
11 Bearing carrier
12 Annular mandrel
13 Hollow cylinder
14 Deep groove ball bearing
15 End section of the compensation shaft
16 Eccentric bearing
17 Outer ring of the eccentric bearing
18 Eccentric raceway
19 Ball
20 Inner ring of the eccentric bearing
21 Central axis of the eccentric raceway
22 Central axis of the annular mandrel
23 Calibrating die
24 First mounting location
25 Front end wall
26 Collar screw
27 Threaded bore
28 Screw collar

The invention claimed is:

1. A mass balancing mechanism for compensating mass forces and/or mass moments of inertia of an internal combustion engine, said mass balancing mechanism comprising two compensation shafts rotatable in opposite directions and further comprising a traction drive which connects a driven pinion of a crankshaft of the internal combustion engine to drive pinions of the compensation shafts through a chain or a toothed belt, and for producing a rotation of the compensation shafts in opposite directions, a spur gearing with first and second meshing spur gears is arranged between one of the drive pinions and the associated compensation shaft, the first spur gear being connected rotationally fast to the one drive pinion and the second spur gear being connected rotationally fast to the associated compensation shaft, and a rotatable eccentric bearing having a rotationally fixable eccentric raceway having a central axis about which the one drive pinion and the first spur gear rotate, the eccentric raceway is rotationally positionable to allow adjustment of a tooth flank lash between the spur gears.

2. The mass balancing mechanism according to claim 1, wherein the eccentric bearing is a rolling bearing comprising an inner ring which forms the eccentric raceway, an outer ring, and rolling elements arranged between said inner and outer rings.

3. The mass balancing mechanism according to claim 2, wherein each of the compensation shafts comprises a drive-side end section on which a rolling bearing that supports the compensation shaft in a radial direction and in axial direction in the internal combustion engine is received, and a bearing carrier that can be fixed on the internal combustion engine is provided on one side of the spur gearing and receives the eccentric bearing and the shaft-side rolling bearing.

4. The mass balancing mechanism according to claim 3, wherein the bearing carrier is a cold shaped sheet metal blank.

5. The mass balancing mechanism according to claim 3, wherein on the eccentric bearing-side, the bearing carrier comprises an annular mandrel which is enclosed by the inner ring of the eccentric bearing, and on a side of the shaft-side rolling bearing, the bearing carrier comprises a hollow cylinder that encloses an outer ring of the shaft-side rolling bearing.

6. The mass balancing mechanism according to claim 5, wherein the inner ring of the eccentric bearing is rotatably fixed by a press fit created between the annual mandrel and the inner ring through a widening of the annular mandrel.

7. The mass balancing mechanism according to claim 5, wherein the annular mandrel serves to receive a screw connection through which the bearing carrier is fixed on the internal combustion engine, and the screw connection is further also configured to rotatably fix the inner ring of the eccentric bearing.

8. The mass balancing mechanism according to claim 7, wherein the screw connection comprises a collar screw that can be screwed into a threaded bore of the internal combustion engine, and the inner ring of the eccentric bearing is clamped axially between the screw collar and the bearing carrier.

9. The mass balancing mechanism according to claim 6, wherein the compensation shafts are configured as tunnel shafts that are insertable in a direction of their axes of rotation into a mounting channel of the internal combustion engine, the one drive pinion, the eccentric bearing, the spur gearing, the bearing carrier, the associated compensation shaft and the shaft-side rolling bearing form a structural unit that can be mounted on the internal combustion engine with the inner ring of the eccentric bearing rotatably fixed on the annular mandrel.

10. A method of assembly of a structural unit of a mass balancing mechanism of claim 9, comprising:
adjusting a tooth flank lash between the spur gears by rotating the inner ring of the eccentric bearing into such a position that the tooth flank lash is situated within a desired range,
retaining the inner ring of the eccentric bearing in the position with the tooth flank lash in the desired range, and plastic widening of the annular mandrel for creating a press fit that rotatably fixes the inner ring of the eccentric bearing on the annular mandrel.

11. The method of claim 10, wherein the annular mandrel receives a screw connection through which the bearing carrier is fixed on the internal combustion engine, with the method further comprising:

inserting the structural unit into the internal combustion engine, and tightening the screw connection, so that the inner ring of the eccentric bearing is rotatably fixed by axial bracing against the bearing carrier.

* * * * *